US006659476B2

United States Patent
Weida (10) Patent No.: US 6,659,476 B2
(45) Date of Patent: Dec. 9, 2003

(54) HORSE TACK CART (76) Inventor: Matthew Weida, 1600 E. Tuscarawas St., Canton, OH (US) 44707

( * ) Notice: Subject to any disclaimer, the term of this patent is extended or adjusted under 35 U.S.C. 154(b) by 0 days.

(21) Appl. No.: 09/894,682

(22) Filed: Jun. 28, 2001

(65) Prior Publication Data

US 2003/0001348 A1 Jan. 2, 2003

(51) Int. Cl.$^7$ .................................................. B62B 1/12
(52) U.S. Cl. ............................... 280/47.19; 280/47.18; 280/35; 280/47.28; 414/446; 211/85.11
(58) Field of Search ........................ 280/47.18, 47.19, 280/47.27, 47.28, 47.35, 47.131, 47.17, 33.992, 79.3; 211/106.01, 1.55, 85.11, 70.6, 18, 18.01; 414/608, 446; 296/3, 143

(56) References Cited

U.S. PATENT DOCUMENTS

| | | | | |
|---|---|---|---|---|
| 1,716,611 A | * | 6/1929 | Wilson | 280/47.18 |
| 3,688,912 A | * | 9/1972 | Wilmoth | 211/85.11 |
| 3,780,971 A | * | 12/1973 | De Filipps | 211/104 |
| 3,827,707 A | * | 8/1974 | Bierman | 280/654 |
| 3,930,663 A | * | 1/1976 | Scripter | 280/654 |
| 4,032,165 A | * | 6/1977 | Russell | 211/123 |
| 4,169,607 A | * | 10/1979 | Reese | 280/47.19 |
| 4,240,353 A | * | 12/1980 | Barth | 104/93 |
| 4,356,922 A | * | 11/1982 | Dierksheide | 211/104 |
| 4,958,594 A | * | 9/1990 | Swagerty | 119/400 |
| 5,054,628 A | * | 10/1991 | Allen | 211/104 |
| D321,773 S | * | 11/1991 | Chiang | D34/17 |
| 5,123,666 A | * | 6/1992 | Moore | 280/47.18 |
| 5,160,154 A | * | 11/1992 | Seydel et al. | 280/47.19 |
| 5,259,521 A | * | 11/1993 | Shaffer et al. | 211/199 |
| 5,338,049 A | | 8/1994 | Goring | |
| 5,338,054 A | * | 8/1994 | Imai et al. | 280/47.26 |
| 5,362,078 A | * | 11/1994 | Paton | 280/35 |
| 5,474,312 A | * | 12/1995 | Starita et al. | 280/47.19 |
| 5,584,399 A | * | 12/1996 | King | 211/189 |
| 5,590,795 A | * | 1/1997 | Wright | 211/104 |
| 5,615,783 A | * | 4/1997 | Warnken | 211/104 |
| 5,626,352 A | * | 5/1997 | Grace | 280/47.29 |
| 5,791,668 A | | 8/1998 | Lenardson | |
| D415,600 S | * | 10/1999 | Hsieh et al. | D34/23 |
| 6,189,706 B1 | * | 2/2001 | Akins | 211/106 |
| 6,247,710 B1 | * | 6/2001 | Luberda | 280/47.18 |
| 2001/0008331 A1 | * | 7/2001 | Tremblay | 280/47.24 |

FOREIGN PATENT DOCUMENTS

CA          2291687 A1 *  6/2001  ............ B60R/9/06

* cited by examiner

Primary Examiner—Brian L. Johnson
Assistant Examiner—Kelly Campbell
(74) Attorney, Agent, or Firm—Sand & Sebolt (57) ABSTRACT A tack cart for transporting and storing tack. The cart includes a conveying member and a storage member mounted thereto. The storage member may be detached from the conveying member and may be mounted onto an independent support located remote from the tack cart. The storage member includes at least one saddle support member which may be detachably mounted on one of the conveying member and the storage member. The cart may further include a detachable bridle support that is receivable on one of the conveying member, the storage member and the independent support.

12 Claims, 8 Drawing Sheets

HORSE TACK CART

BACKGROUND OF THE INVENTION

1. Technical Field

The invention relates generally to wheeled carts and more particularly to a wheeled cart for transporting and storing horse saddles and other equipment.

2. Background of the Invention

Horse saddles are heavy, cumbersome pieces of equipment. The weight and shape of the saddles make it difficult to move them around with ease. When horse owners are involved with horse shows, they have a problem moving the saddles, bridles and other supplies from their trailers to the provided stalls. Space is at a premium at horse shows and consequently there is a problem storing the saddles and other tack in a place and manner which makes them conveniently available, yet out of the way.

Problems may also be experienced at an owner's stables where the area where tack is stored is some distance from the horse stall. A rider would therefore have to carry the saddles and bridles from the storage area to the stall—a tedious and tiring task.

A number of wheeled tack carts have been proposed in the prior art to assist horse owners in transporting their tack. Some of the U.S. patents which have been granted for tack carts include U.S. Pat. No. 3,930,663 (Scripter); U.S. Pat. No. 5,338,049 (Goring), U.S. Pat. No. 5,474,312 (Starita et al) and U.S. Pat. No. 5,362,078 (Paton).

Scripter (U.S. Pat. No. 3,930,663) discloses a wheeled cart which is designed to transport one saddle at a time. When the user reaches their destination, a ground support is pivoted outwardly from the main frame to allow the cart to stand independently. The saddle is removed and the cart may be folded up for storage. This cart does not provide a way for transporting bridles or any other supplies unless they are draped over the saddle. Additionally, if the cart is used to transport a saddle to a stall where space is at a premium, such as at a horse show, the cart cannot be used to store the saddle efficiently as it takes up additional floor space in the stall.

Goring (U.S. Pat. No. 5,338,049), discloses a tack cart which may be used to transport one saddle. The cart includes a storage box which can be used to transport bridles and other supplies. As with the cart proposed by Scripter, the Goring cart becomes a problem for temporarily storing tack in an area where space is tight. In fact the cart is more problematic in that it cannot be folded for storage.

The cart proposed by Starita et al (U.S. Pat. No. 5,747,312), is also designed for the transportation of one saddle and it may be collapsed for storage. The cart is designed to carry a wide array of supplies. This device is however problematic when space is tight—it may be used to hold a saddle and supplies but takes up valuable floor space; or it can be folded away for storage-leaving nothing to hold the saddle and bridles.

Finally, the cart proposed by Paton, U.S. Pat. No. 5,362,078, is adapted to carry more than one saddle at a time and can be separated to form a saddle holding rack and a separate cart for transporting other supplies. This cart does not, however, address the problem with taking up valuable stall space while still providing a device for holding saddles and bridles. If the saddle holding rack is separated from the cart, it still occupies floor space in the stall.

SUMMARY OF THE INVENTION

The present invention provides a tack cart that may be used to transport and store tack. The tack cart includes a conveying member and a storage member. The storage member may be detached from the conveying member and may be mounted onto an independent support located remote from the storage member. The storage member may include at least one saddle support member that may be detachably mounted on either the conveying member or the storage member. The cart may further include a detachable bridle support that is receivable on the conveying member or the storage member or the independent support.

BRIEF DESCRIPTION OF THE DRAWINGS

The preferred embodiments of the invention, illustrative of the best modes in which applicant has contemplated applying the principles of the invention, are set forth in the following description and are shown in the drawings and are particularly and distinctly pointed out and set forth in the appended claims.

Similar numerals refer to similar parts throughout the specification.

DESCRIPTION OF THE PREFERRED EMBODIMENTS

The tack cart, shown generally at 10, includes a base 12, a first frame 14 attached to base 12, a second frame 16 releasably attachable to first frame 14, and at least one saddle support 18 which is detachably receivable on either the first or second frame 14, 16.

Figure 2:
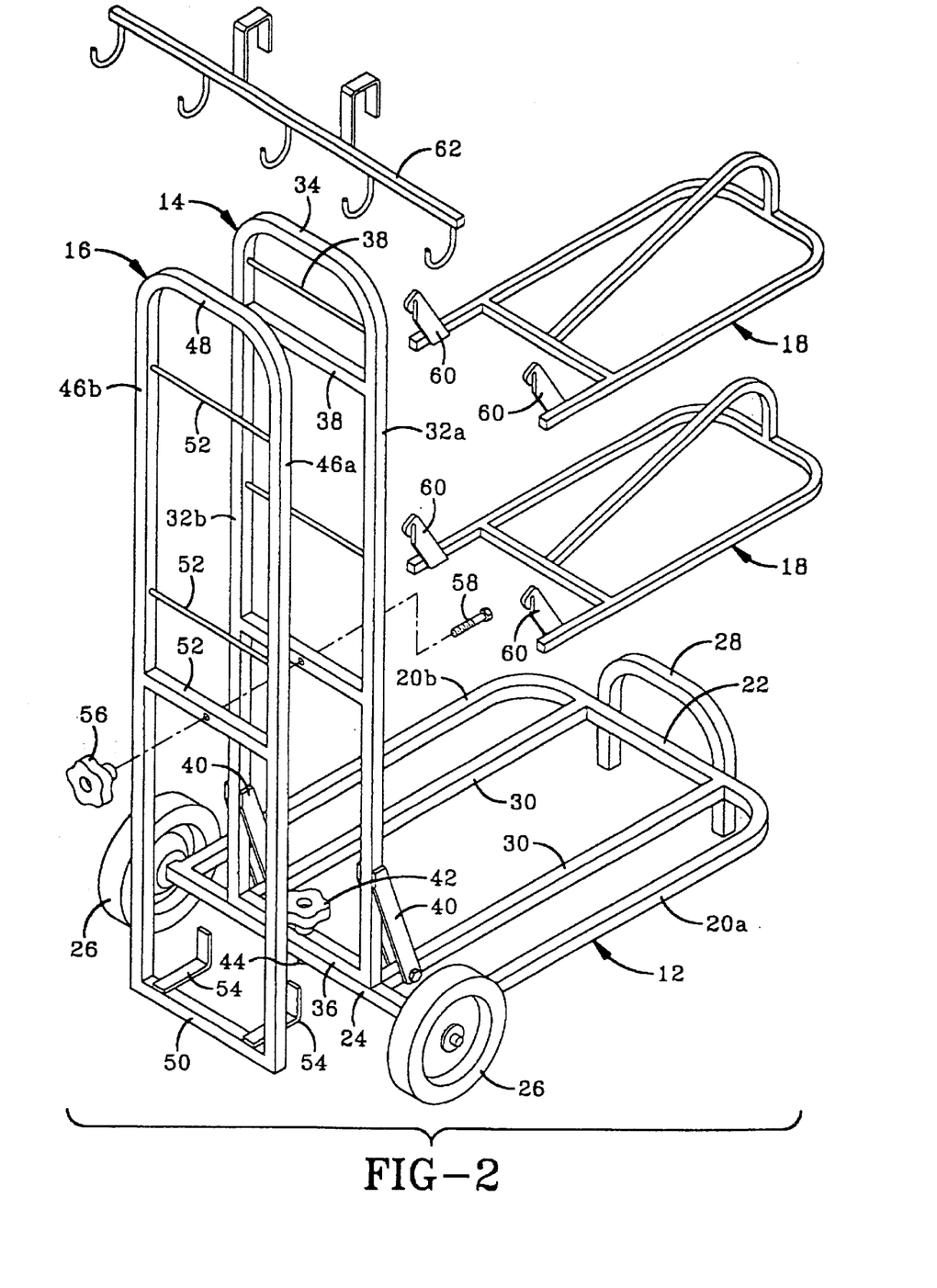
FIG. 2 is an exploded perspective view of the horse tack cart.

Referring to FIG. 2, base 12 of tack cart 10 is substantially rectangular having two parallel side bars 20a, 20b, and first and second end bars 22, 24. Wheels 26 may be mounted to second end bar 24 so that cart 10 may be easily rolled from place to place. Leg 28 mounted on first end bar 22 prevents cart 10 from accidentally rolling away when the cart is not in motion. The top of the leg 28 is joined to function like a handle. Struts 30 are provided between first and second end bars 22, 24 to strengthen base 12 and to provide an additional support surface to hold articles carried on tack cart 10. While struts 30 are shown as extending between first and second end bars 22, 24, it is to be understood that they can also extend between side bars 20a, 20b or can take any other position or configuration which will either strengthen base 10 or add support surface for carrying articles. The number and placement of both wheels 26 and legs 28 may also be changed without departing from the scope of this invention.

First frame 14 is substantially rectangular, having side rails 32a, 32b and first and second end rails 34, 36. First end rail 34 forms a handle for tack cart 10 and may be slightly rounded. First ribs 38 extend between side rails 32a and 32b. First ribs 38 may be of any suitable cross section to enable them to engage saddle supports 18. First frame 14 is attached to base 12 with brackets 40 which are secured to either struts 30 or side rails 20a, 20b. A first nut 42 and bolt 44 are provided to releasably secure the second end rail 36 to the second end bar. First nut 42 may be provided with an enlarged head so as to be easily handled by the user. When first nut 42 is removed, first frame 14 may be pivoted into contact with base 12 so that cart 10 may be stored in a collapsed position (not shown).

Second frame 16 is similar to first frame 14 in appearance, having side posts 46a, 46b, and first and second end posts 48, 50. Second ribs 52 extend between side posts 46a, 46b and are configured to receive saddle supports 18. At least one hook 54 is provided to engage first frame 14. While hooks 54 are shown engaged with second end post 50, they may be located in any other suitable position on second frame 16 so as to releasably hold first and second frames 14, 16 together. Second nut 56 and bolt 58 secure second frame 16 to first frame 14. However, any other suitable securement mechanism may be employed such as a strap with a buckle, a strap with velcro, bungee cords, clips, etc.

At least one saddle support 18 is receivable on either first ribs 38 of first frame 14 or second ribs 52 of second frame 16. Any suitable mechanism may be used to engage the saddle supports on braces 38 or ribs 52. As shown in FIG. 2, pairs of hooks 60 may be provided to engage ribs 38 or ribs 52. A bridle support 62 is also receivable over first ribs 38 or second ribs 52 for transporting bridles and the like.

Figure 9:
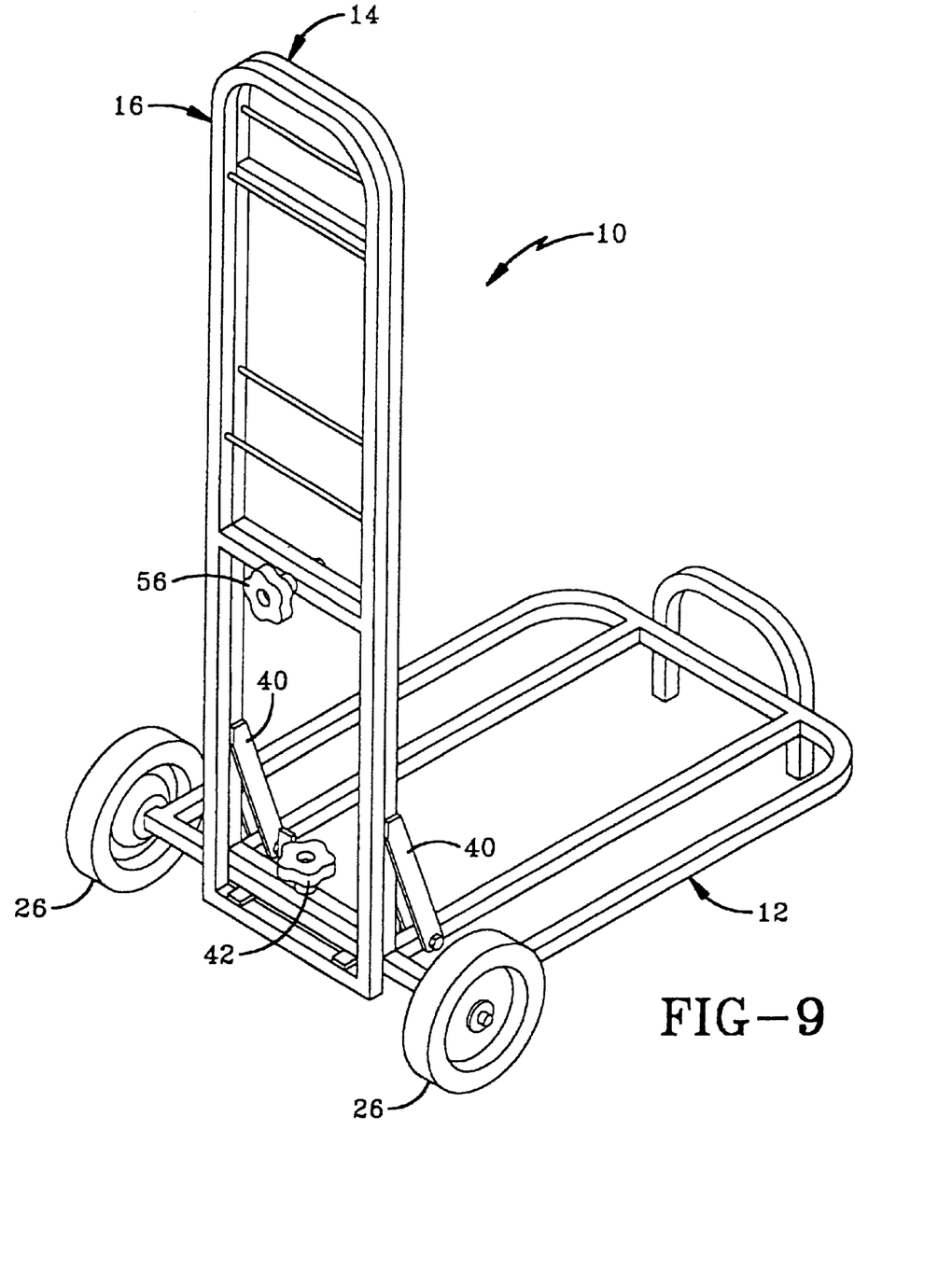
FIG. 9 is a perspective view of the tack cart with the saddle supports detached.

Tack cart 10 of the present invention is used in the following manner:

First frame 14, and engaged second frame 16, are rotated away from base 12 and are locked into the upright position shown in FIG. 9 by screwing nut 42 onto bolt 44. (Nut 42 is provided with an enlarged handle so as to be easily manipulated by the user.) As shown in FIG. 9, without saddle supports 18 installed on first frame 14, the tack cart 10 can be used to transport bales of hay and other articles (not shown). The bales are placed on base 12, resting on struts 30 and against first frame 14.

Figure 1:
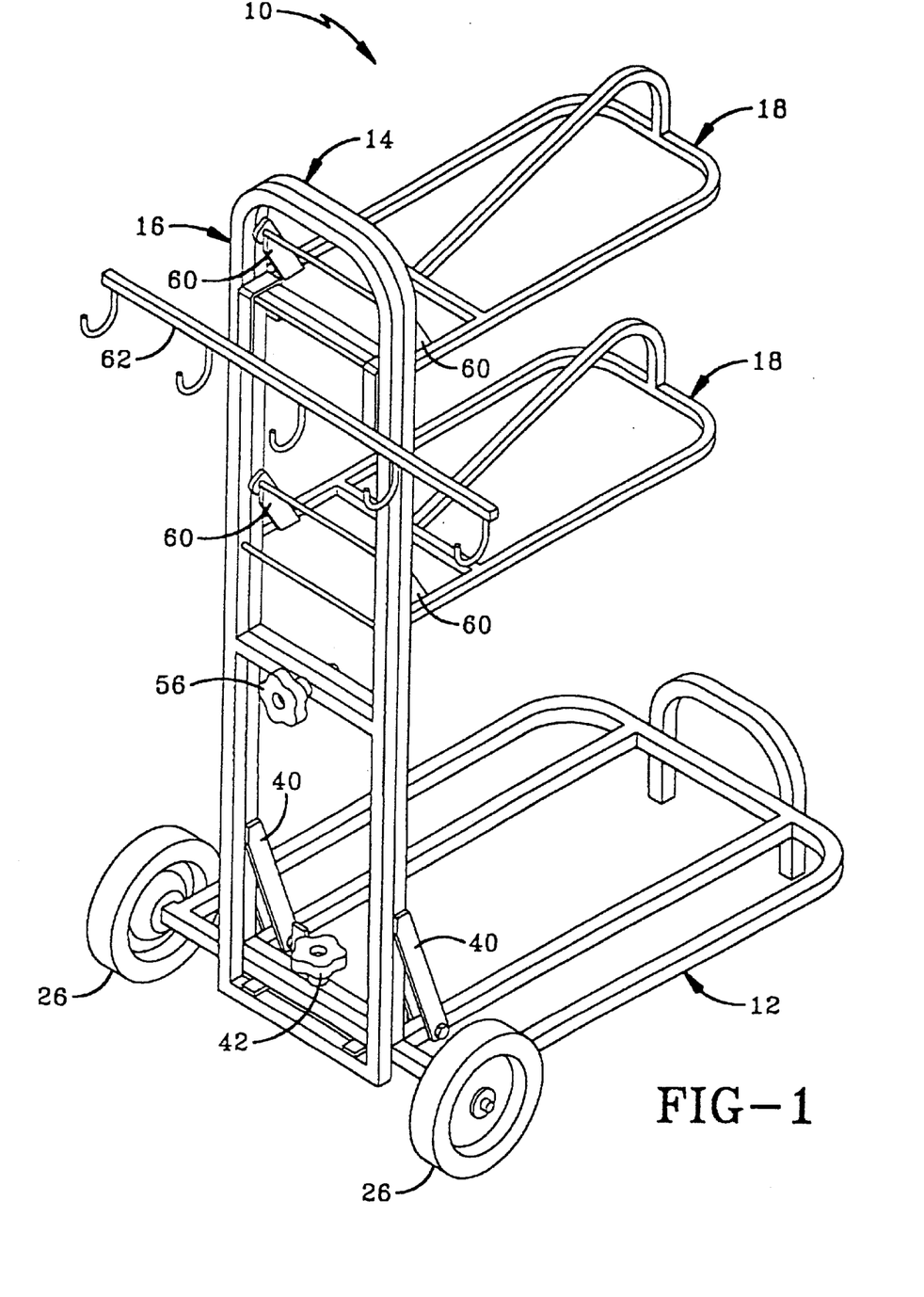
FIG. 1 is a perspective view of the horse tack cart.
Figure 3:
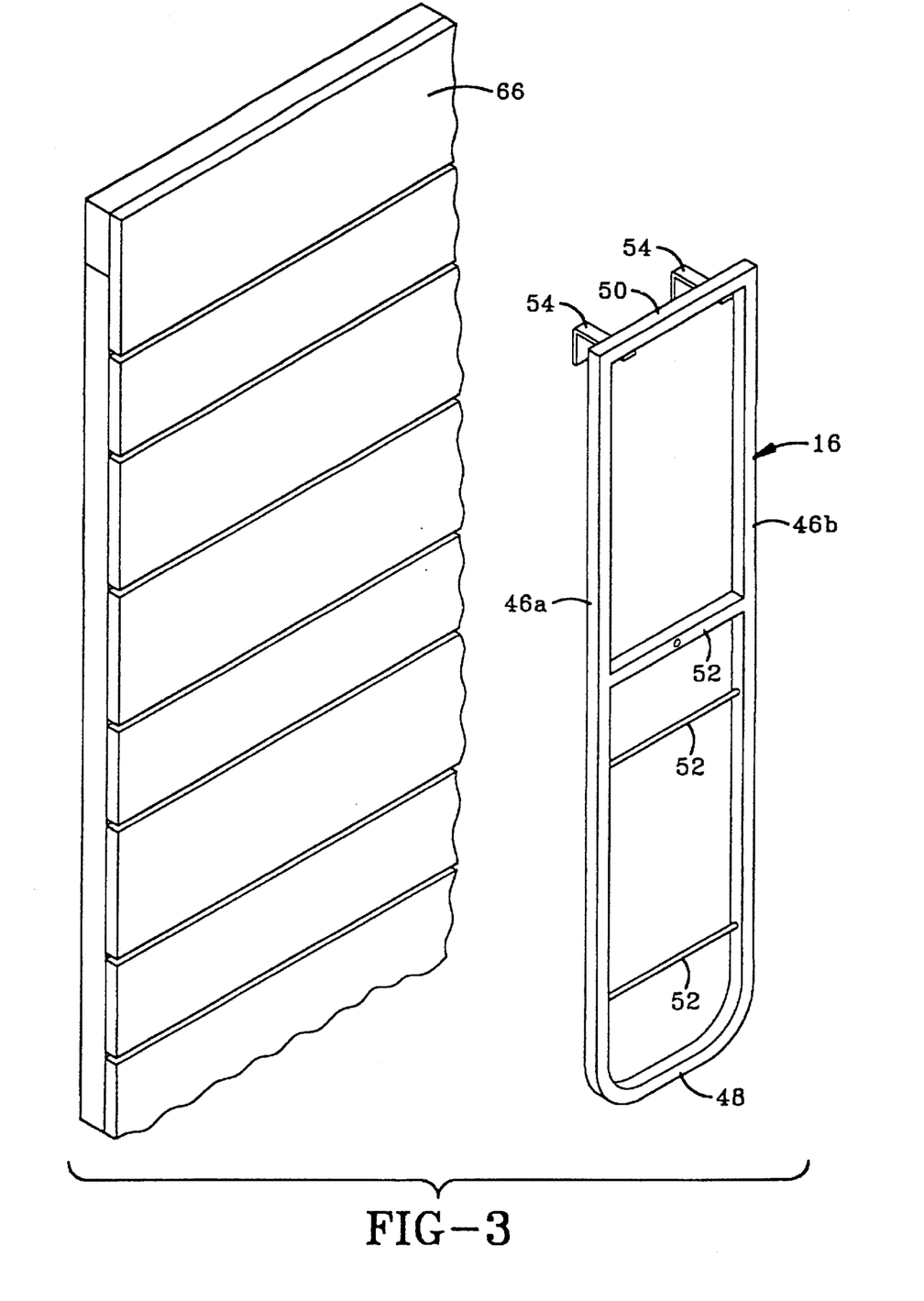
FIG. 3 is a perspective view of the second frame member disengaged from the tack cart and in a position for engaging a stall wall or door.
Figure 4:
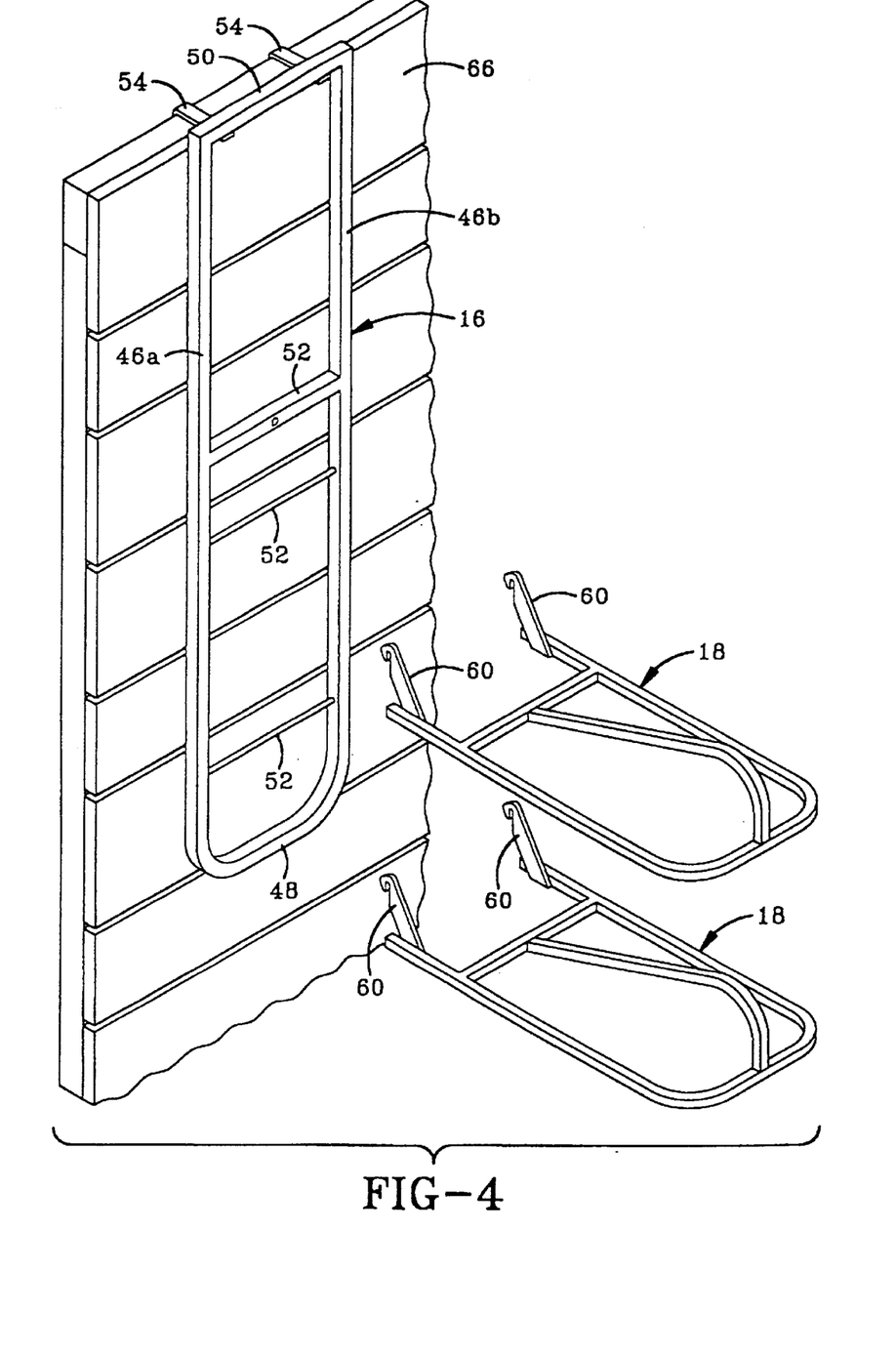
FIG. 4 is a perspective view of the second frame member in position on a stall wall with the saddle supports in position for engaging the second frame member.
Figure 5:
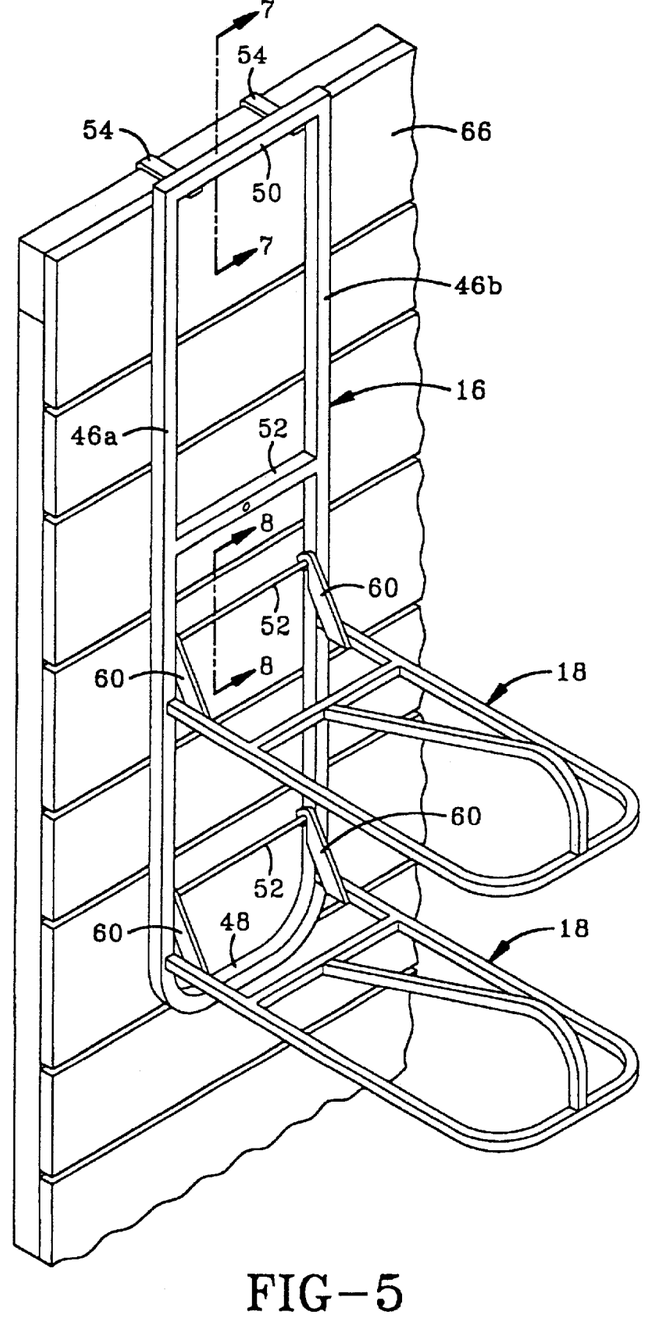
FIG. 5 is a perspective view of the second frame member engaged on a stall wall.
Figure 6:
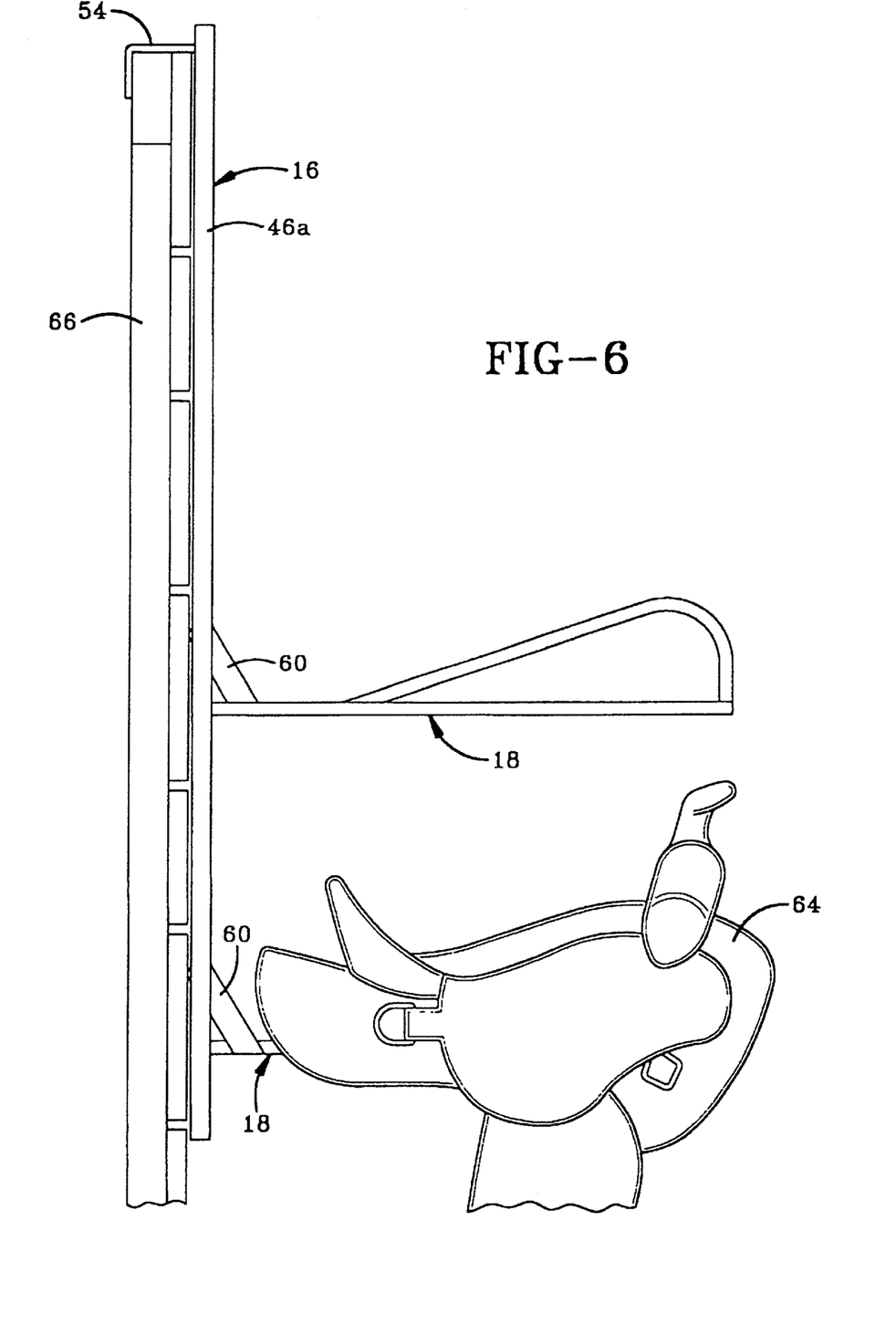
FIG. 6 is a side view of the second frame member engaged on a stall wall and supporting a saddle thereon.
Figure 7:
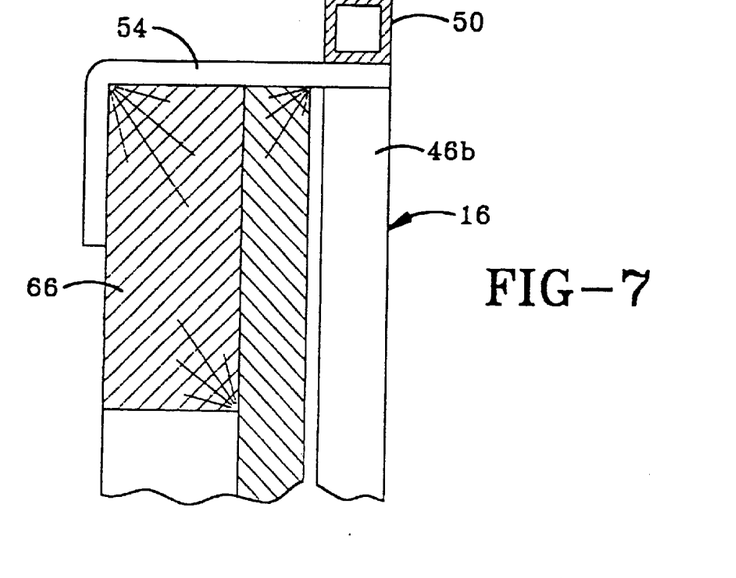
FIG. 7 is an enlarged cross-sectional view of the upper portion of the second frame member through line 7—7 of FIG. 5.
Figure 8:
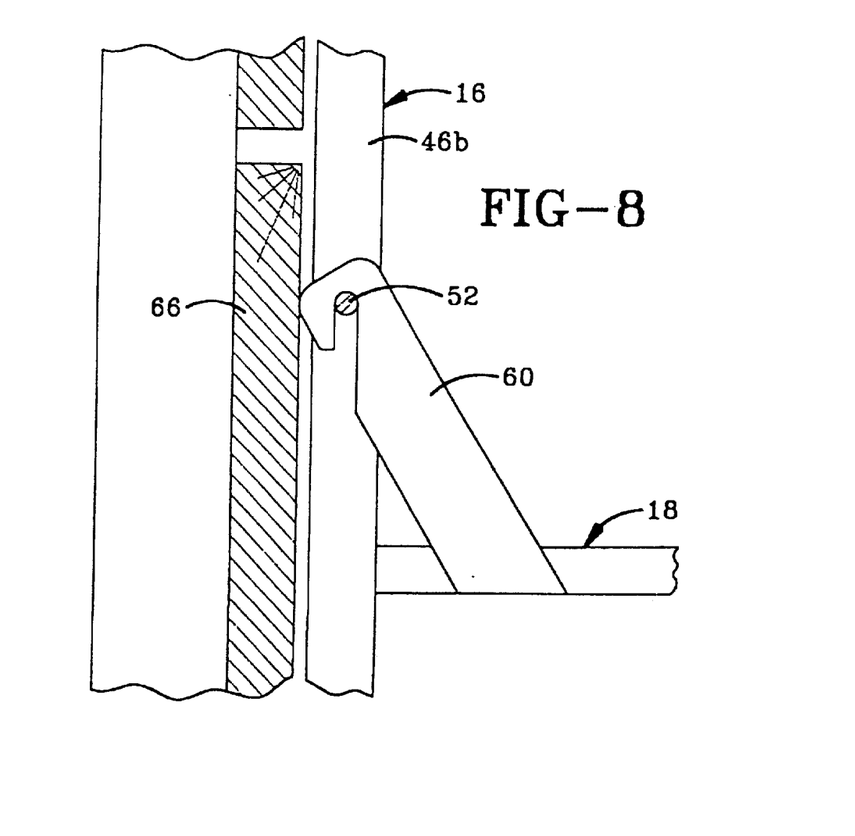
FIG. 8 is an enlarged cross-sectional view of the saddle support attachment to the second frame member through line 8—8 of FIG. 5.

When it is desired to transport saddles and bridles, saddle supports 18 are positioned on first ribs 38, bridle support 62 is placed over first ribs 38 as shown in FIG. 1. Saddles 64 may then be placed onto saddle supports 18. When the user reaches the stall, second frame 16 is detached from first frame 14 by unscrewing the second nut 56 and bolt 58. Hooks 54 are disengaged from second end bar 24 so that second frame 16 is independent of tack cart 10. In the embodiment shown (FIG. 3), second frame 16 is rotated upside down through 180 degrees. In embodiments where hooks 54 are not positioned in the manner shown in FIG. 2, there may be no need to rotate second frame 16 once it is detached from first frame 14. Hooks 54 are used to releasably secure second frame 16 to a suitable support such as a stall door or wall 66 (FIG. 4). Saddle supports 18 are then attached to second frame 16 by engaging hooks 60 over second ribs 52 (FIGS. 5 through 8). Saddles 64 may then be positioned on the saddle supports 18. Bridle support 62 may be positioned on either second frame 16 or directly onto stall wall 66. The saddles and other tack are therefore supported above the ground in a manner that allows for maximum utilization of space within the stall. The first frame 14 may be collapsed onto base 12 so that frame 14 and base 12 may be stored away easily in a small space.

When it is time to leave the show, saddles 64 are removed from saddle supports 18, saddle supports 18 are removed from second frame 16 and are re-engaged with the first ribs 38; second frame 16 is rotated through 180 degrees (in the case of the embodiment shown) and is re-engaged with first frame 14. The saddles are re-positioned on saddle supports 18 and the cart may be wheeled to the next desired location.

In the foregoing description, certain terms have been used for brevity, clearness, and understanding; but no unnecessary limitations are to be implied therefrom beyond the requirement of the prior art, because such terms are used for descriptive purposes and are intended to be broadly construed.

Moreover, the description and illustration of the invention are by way of example, and the scope of the invention is not limited to the exact details shown or described.

Having now described the features, discoveries, and principles of the invention, the manner in which the horse tack cart is constructed and used, the characteristics of the construction, and the advantageous new and useful results obtained; the new and useful structures, devices, elements, arrangements, parts, and combinations are set forth in the appended claims.

What is claimed is:

1. A tack cart for storing and transporting tack, the tack cart comprising:

a base;

a first frame releasably connected to the base, the first frame being foldable into engagement with the base;

a substantially flat second frame releasably connected to the first frame;

at least one hook disposed on the second frame; wherein the second frame is adapted to be detached from the first frame and hung by said hook on an independent support located remote from the first frame whereby said second frame is suspended above a surface upon which the base rests; and at least one saddle support selectively and detachably mountable on both the first frame and the second frame.

2. A tack cart as defined in claim 1, further comprising:

at least one wheel mounted on one of the base and the first frame.

3. A tack cart as defined in claim 1, wherein the second frame has at least one connector; the connector configured to connect the second frame to either one of the second frame and the independent support.

4. A tack cart as defined in claim 1, wherein the first frame has:

two side bars;

two end bars connected to the side bars; and at least one rib extending between the side bars.

5. A tack cart as defined in claim 4, wherein the saddle support is detachably mountable on the rib of the first frame.

6. A tack cart as defined in claim 1, wherein said second frame has:

two side bars;

two end bars connected to the side bars; and at least one rib extending between the side bars.

7. A tack cart as defined in claim 6, wherein the saddle support is detachably mountable on the rib of the second frame.

8. A tack cart as defined in claim 1, wherein the first frame and second frame are substantially identical in appearance, and each of the first frame and second frame has:

two side bars;

two end bars connected to the side bars; and at least one rib extending between the side bars.

9. A tack cart as defined in claim 8, further comprising;

a saddle support detachably receivable on either one of the rib of the first frame and the rib of the second frame.

10. A tack cart as defined in claim 1, further comprising:

a bridle support which is releasably attachable to either one of the first frame and the second frame.

11. A tack cart as defined in claim 10, wherein the bridle support has a connector for connecting the bridle support to either one of the first frame, the second frame and the support.

12. A tack cart for storing and transporting tack; the tack cart comprising:

(e) a base having mounted thereon:
    at least one wheel, and a ground-engaging support, said support being mounted a spaced distance from the wheel;

(f) a first frame foldably connected to the base, the first frame having:
    two first side bars,
    two first end bars connected to the first side bars; and
    at least one first rib extending between the first side bars;

(g) a substantially flat second frame releasably connected to the first frame, said second frame having:
    two second side bars,
    two second end bars connected to the second side bars; and
    at least one second rib extending between the second side bars; said second frame being removable from the first frame and mountable on the independent support;

(h) at least one saddle support detachably mountable on one of the first rib and second rib.

* * * * *